(No Model.)
W. MASON.
ELECTRICAL PRIMER.
No. 520,116. Patented May 22, 1894.
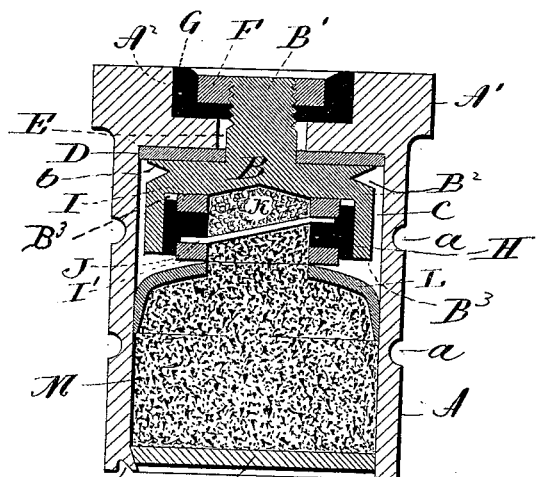
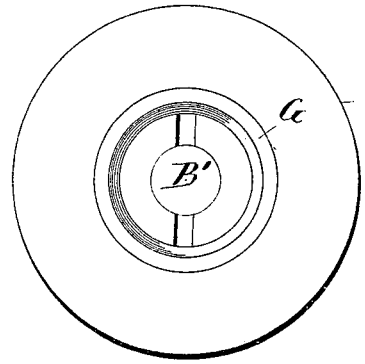
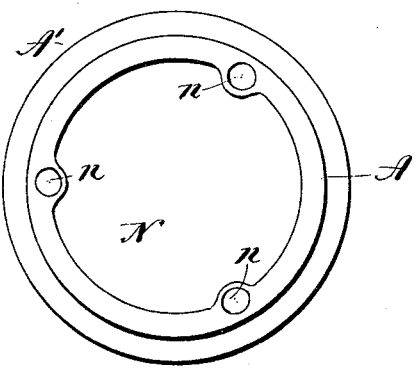
Witnesses,
J. H. Shumway
Lillian D. Kelsey
William Mason, Inventor
By attys
Earle H. Seymour

UNITED STATES PATENT OFFICE.

WILLIAM MASON, OF NEW HAVEN, CONNECTICUT, ASSIGNOR TO THE WINCHESTER REPEATING ARMS COMPANY, OF SAME PLACE.

ELECTRICAL PRIMER.

SPECIFICATION forming part of Letters Patent No. 520,116, dated May 22, 1894.

Application filed January 15, 1894. Serial No. 496,943. (No model.)

*To all whom it may concern:*

Be it known that I, WILLIAM MASON, of New Haven, in the county of New Haven and State of Connecticut, have invented a new Improvement in Electric Primers; and I do hereby declare the following, when taken in connection with accompanying drawings and the letters of reference marked thereon, to be a full, clear, and exact description of the same, and which said drawings constitute part of this specification, and represent, in—

Figure 1, an enlarged view in vertical central section of an electric primer constructed in accordance with my invention; Fig. 2, a plan view thereof; Fig. 3, a similar reverse view.

My invention relates to an improvement in electric-primers, the object being to produce a simple and reliable device, constructed with particular reference to convenience of assemblance and testing.

With these ends in view, my invention consists in the combination, in an electric primer, with a metal shell, of a chambered head located therein and insulated therefrom, an insulating ring located within the chamber of the said head, and having its opposite faces recessed, an igniting wire extending diagonally across the central opening of the ring, and metal connecting washers adapted to fit closely into the recesses in the opposite faces of the ring, and to bear upon the opposite ends of the wire which they firmly hold in place.

My invention further consists in an electric-primer having certain details of construction and combinations of parts as will be hereinafter described, and pointed out in the claims.

In carrying out my invention, I construct, in any approved manner, a shell A, which is preferably drawn from a single piece of metal, and which has a flanged head A', and circumferential grooves $a$ formed in its body. In the bottom of this shell I locate in insulation therefrom, a chambered head B, of circular form, but smaller in diameter than the internal diameter of the shell, so as to leave an insulating space C between the same and the periphery of the head. The inner face of the said head is insulated from the flanged head of the shell by means of a washer D, formed from mica. The said head is held in place by means of an outwardly projecting threaded stem B' formed integral with it, partly insulated from the shell by a space E formed in the flanged head thereof, and receiving at its extreme outer end a brass nut F, which is insulated from the shell by means of a washer G, formed of insulating material, such as rubber, or vulcanized fiber, and containing in its outer face a recess adapted in size to receive the nut F, and itself set into a circular recess $A^2$, formed in the flanged head of the shell.

It will be understood from the foregoing description that the chambered head B is thus entirely insulated from the shell. At the base of the said chambered head I form a deep circumferential V-shaped groove $B^2$, forming a gas check, which receives any gas which may be forced rearward. The said groove is located so as to make the extreme inner edge $b$ of the head yielding, whereby it springs under the pressure of the gas, and is pressed with such force against the mica washer D, as to form a gas-tight joint. The circular chamber $B^3$ formed in the said head B, opens outward, and receives an annulus or ring H, formed of insulating material, such as rubber or vulcanized fiber, and adapted to fit tightly within the chamber $B^3$. The opposite faces of the said annulus are correspondingly recessed to receive friction tight connecting washers I and I', formed of brass or other material and serving to hold in place the platinum igniting wire J, the opposite ends of which are placed in the bottoms of the recesses formed in the opposite faces of the insulating ring H, the said wire extending diagonally through the central opening of the ring. This wire, it may be observed, is formed by preference of an alloy of platinum and irridium, and is of extremely small gage, and difficult to handle and secure in place. I am enabled, however, by means of the said brass connecting washers to firmly secure it in place without the use of solder, and very conveniently, the said connecting washers being constructed so that they can be "snapped," so to speak, into the recesses formed in the annulus to receive them. If desired, the connections which the ends of the wire make with the metal connecting washers I and I', may be readily tested before the annulus is introduced into the chambered head B, for it will be understood that I assemble the igniting wire and the connecting washers and annulus together before they are put into the said head. Around the wire J, and within the annulus, I pack gun-cotton K, or equivalent material. The said annulus is held in place within the chamber of the said head by means of a brass connecting cup L, having a central opening, and impinged against the washer I' which is thus placed, through the medium of the cup, in electric connection with the shell. Furthermore as the cup is shoved inward, it forces the annulus inward and presses the connecting washer I into close contact with the chambered head B. That portion of the shell not occupied by the devices above described, is filled with powder M, which is retained in place by means of a card-board disk or wad N, held in place by upsetting the edge of the shell as at n, at three or more points, as shown in Fig. 3. The powder may be allowed to come into direct contact with the gun-cotton, or they may be separated as by a thin piece of tin-foil, which I have not shown.

It will be understood from the foregoing description that the igniting wire J is entirely insulated from the shell A, except that one of its ends is connected with the same through the metal connecting washer I' and the cup L. The other end of the wire is insulated from the shell, but is placed in an electric circuit through the medium of the nut F connected with the chambered head. In testing or in firing the primer, one wire of the discharging circuit is therefore connected with the said nut, and the other with the gun with which the shell is in contact.

In firing the primer the path of the current will be through the nut F', the stem B' and the body of the chambered head B, the connecting washer I, the igniting wire J, the connecting washer I', the cup L and the shell H.

It will be seen that the several parts of my improved electric primer are adapted by their form and construction to be readily and accurately made, and to be conveniently and accurately assembled. It will also be clear that the delicate platinum wire is readily and firmly located without the use of solder, and that it is protected against injury by its location within the insulating annulus and connecting washers. Furthermore, it is so firmly placed that it will not be disturbed in charging the shell with gun-cotton and powder. The contacts which its ends make with the brass connecting washers are long, and of an effective character, and give the primer reliability of operation.

Having fully described my invention, what I claim as new, and desire to secure by Letters Patent, is—

1. In an electric primer, the combination with a metal shell, of a chambered head located therein and insulated therefrom, an insulating ring located within the chamber of the said head, and having its opposite faces recessed, an igniting wire extending diagonally across the central opening of the ring, and metal connecting washers adapted to fit closely into the recesses in the opposite faces of the ring, and to bear upon the opposite ends of the wire which they firmly hold in place, substantially as described.

2. In an electric primer, the combination with the shell thereof, of a chambered head located therein and insulated therefrom, and constructed with an outwardly extending threaded stem, a washer of mica interposed between the inner face of the chambered head and the flanged head of the shell, a metal nut applied to the outer end of the threaded stem for holding the chambered head in the shell, an insulating washer located in the head of the shell and receiving the said nut which it insulates therefrom, and an igniting wire located within the chambered head and in electrical connection at one end therewith, and at the other end with the shell, substantially as set forth.

3. In an electric primer, the combination with the shell thereof, of a chambered head located therein and insulated therefrom, an igniting wire located within the chamber of the said head, means for holding the ends of the wire in place and a metal cup located within the shell and engaging with the said means to hold them in place within the head, substantially as set forth.

4. In an electric primer, the combination with the shell thereof, of a chambered head located therein in insulation therefrom, and constructed at its inner end with a deep groove forming a gas-check, and reducing the said end of the head enough to form a yielding edge, an igniting wire located within the head, and means for retaining it in place therein and for establishing electrical connection between it and the shell, substantially as described.

In testimony whereof I have signed this specification in the presence of two subscribing witnesses.

WILLIAM MASON.

Witnesses:
GEO. D. SEYMOUR,
FRED C. EARLE.